3,460,759
COMBUSTION CHAMBER
John W. Gregory, Middleburg Heights, and Donald L. Nored, Cleveland, Ohio, assignors to the United States of America as represented by the Administrator of the National Aeronautics and Space Administration
Filed Mar. 7, 1967, Ser. No. 621,742
Int. Cl. B64d 33/04
U.S. Cl. 239—127.1                           14 Claims

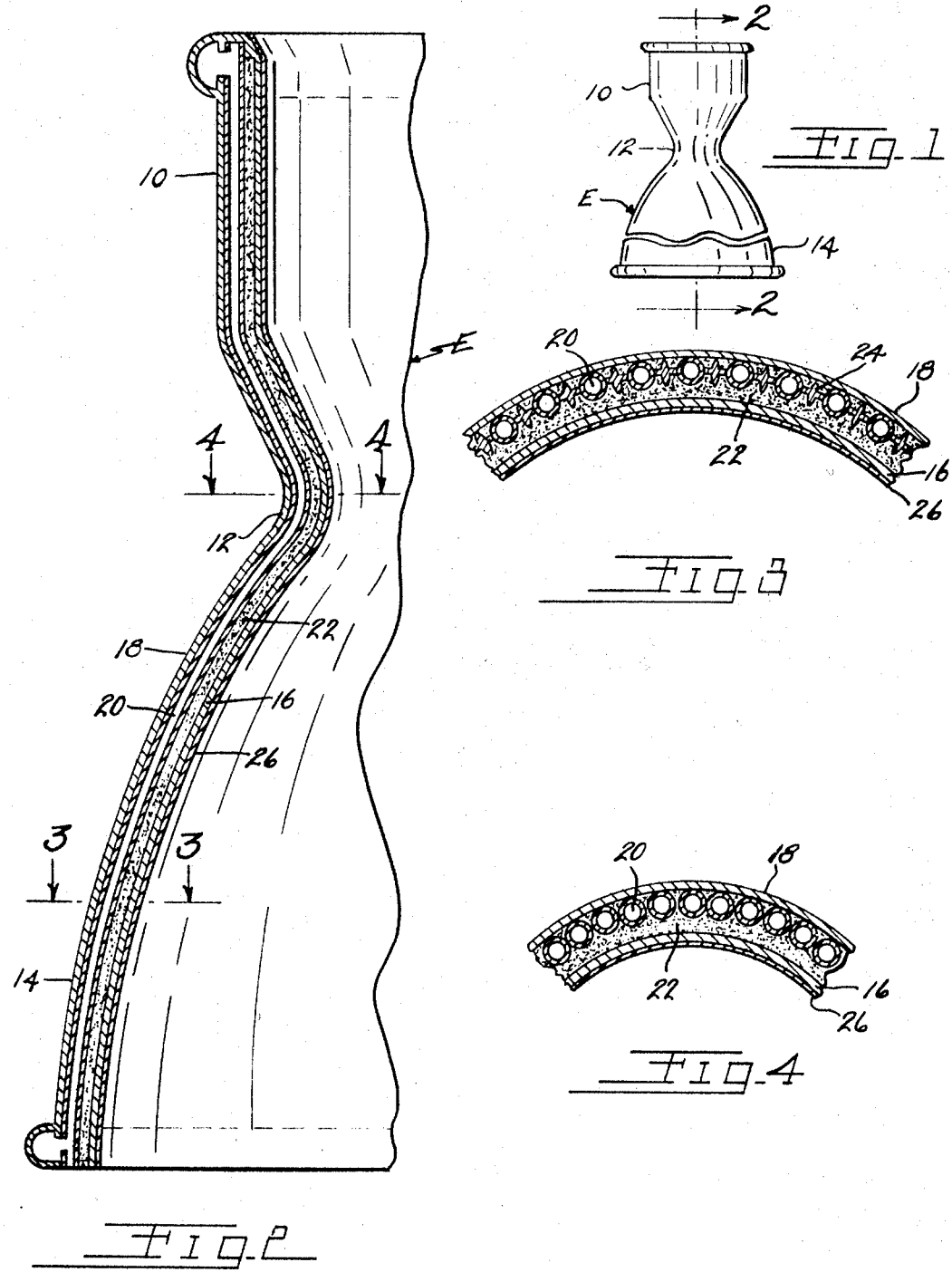

ABSTRACT OF THE DISCLOSURE

A rocket combustion chamber including a downstream convergent-divergent throat section and having an inner wall of high temperature material, an outer structural wall spaced from the inner wall, a plurality of regenerative coolant tubes of constant cross-section longitudinally disposed in the space between the walls, and a variable thickness, powdered-ceramic heat barrier also disposed in such space and encasing the coolant tubes therein. The coolant tubes are spaced apart at the combustion chamber portion and are contiguous at the throat section. Heat dispensing fins are disposed between and secured to the tubes at the combustion chamber portion. The heat barrier is of increased thickness at the throat section.

---

The invention described herein was made by employees of the United States Government and may be manufactured and used by or for the Government of the United States of America for governmental purposes without the payment of any royalties thereon or therefor.

This invention relates to rocket combustion chambers and more particularly to cooling means therefor.

Rocket combustion chambers and nozzles frequently operate at temperatures considerably higher than the melting temperatures of the material with which the chamber or nozzle is lined. Some from of cooling system must, therefore, be provided to prevent the liner from burning out before the termination of the operation of the chamber or nozzle. Present and past attempts to build satisfactory high-performance cooled rocket thrust chambers have had limited success due to the basic problems in refractory metals such as formability and brittleness, porous material characteristics, pressure distribution in the nozzle, nozzle weights, etc. Many designs which have evolved are quite complex or heavy and require fabrication procedures which exceed the state of the art for materials which can be used. In addition, many configurations do not have adequate strength and shock resistance to withstand the initial firing period.

Various methods have been proposed for cooling the walls of the rocket engine combustion chamber and/or the thrust nozzle to thereby protect the same against the severe temperature and erosive conditions experienced with the products of combustion of rocket propellents in use at the present time and contemplated for the future. The proposed methods have not been entirely satisfactory for a number of reasons such as weight penalties imposed by the cooling structure and/or the cooling mechanism, nozzle throat dimension changes resulting from the use of ablating materials therein, etc.

A common type of cooling means employed to cool rocket combustion chambers is regenerative cooling. A regeneratively cooled thrust chamber usually consists of a bundle of tapered, contoured tubes or channels that are furnace brazed together to form a pressure-tight assembly. This structure usually utilizes the rocket fuel as a coolant, such fuel being circulated through the tubes which form a heat exchanger, thereby absorbing heat by forced convection. In such structure, the fabrication methods involved require that a large number of tubes or channels (e.g., 180 tubes for example in one engine) must be tapered to provide an exact cross-sectional area at each axial station and must be bent to form the correct contour and inside diameter of the chamber, throat, and nozzle. This fabrication method involves tedious, expensive and time-consuming techniques, such as die forming, hand assembly of tubes, and furnace brazing. After the thrust chamber has been brazed, it often is not pressure tight, which is not surprising considering the large number of brazed joints, and must be repaired by hand brazing. Because of such expensive and slow fabrication processes, the thrust chamber design cannot be readily changed once it has been fixed to accommodate new innovations or changes of nozzle contour, nozzle area ratio, or propellents.

Although useful and versatile as regenerative cooling is, it has certain operational limitations such as available coolant pressure drop, the limiting heat flux for nucleate boiling for the fuel, and the allowable temperature increase of the wall material. Also, since there is only a thin metal wall separating the coolant from the high temperature combustion gases, heat flux levels are generally high, with the result that the service life of most thrust chambers is rather short.

As mentioned, the above regenerative cooled thrust chamber construction methods employ fabrication techniques such as die forming, hand assembly of tubes on a mandrel, and furnace brazing, which are tedious, expensive, and time consuming. In addition, such thrust chambers generally are suitable only for use with good coolant fuels such as hydrogen or RP–1 because the wall heat flux becomes very high at the throat region. The heat flux is a function of the overall temperature difference between the hot gases and the coolant and the overall thermal resistance, which normally consists of a hot side boundary layer (film) resistance, the metal wall resistance, and the coolant side boundary layer resistance. In general, rocket thrust chambers are designed to function at a constant wall temperature, for example, 1700° F., and the coolant side heat transfer coefficient is adjusted at each axial station to maintain this temperature by varying the tube cross-sectional area. At the throat, the hot side film resistance decreases because of the increase in Reynolds Number, and the heat flux therefor increases. Consequently, the coolant side film resistance must also be decreased so that the higher heat load may be removed without an increase in the wall temperature. This is accomplished by reducing the tube cross-sectional area thereby increasing the flow velocity. However, reducing the tube cross-sectional area involves the aforementioned problems of expensive and time-consuming tube or channel forming and expensive furnace brazing procedures.

Therefore, it is an object of the invention to provide a regenerative cooling system for rocket combustion chambers involving inexpensive fabrication techniques and employing primarily inexpensive materials.

It is a further object of the invention to provide a regenerative cooling system for rocket combustion engines wherein the heat flux to the coolant is substantially reduced.

A further object of the invention is to provide regenerative cooling for rocket combustion engines wherein the operational life of the combustion chamber is substantially increased.

A further object of the invention is to provide a regenerative cooling system for rocket combustion engines wherein the fabrication time is substantially reduced.

A further object of the invention is to provide a regenerative cooling system for rocket combustion engines that is simple in construction, inexpensive to manufacture, and highly effective in operation.

Briefly, the foregoing objects are accomplished by the provision of a rocket thrust chamber including an annular, hollow, enclosure with an upstream cylindrical combustion chamber section, a contiguous downstream convergent-divergent throat section having a cross-sectional area smaller than that of the combustion chamber, and an exhaust nozzle section diverging from the throat section. The enclosure includes an annular refractory inner wall of high temperature material, an annular outer structural wall spaced from the inner wall to form a space therebetween, a plurality of longitudinally disposed regenerative coolant tubes of constant cross-section positioned in the space between such walls in side-by-side relation and having circulating fluid coolant therein, and a coacting variable-thickness ceramic heat barrier also disposed in the space between the walls and encasing the coolant tubes therein. The coolant tubes are circumferentially spaced apart at the combustion chamber section and at the exhaust nozzle section and are contiguous at the throat section. At the combustion chamber section and at the exhaust nozzle section, the tubes are circumferentially connected together by heat dispensing fins disposed between and secured to the tubes. The ceramic heat barrier is of increased thickness at the throat section. Such heat barrier may be formed, for example, from a powdered ceramic such as aluminum oxide, or magnesium oxide. Foamed ceramics or certain foamed metals may also be used.

With this structure, coolants with relatively low cooling capacity may be employed. For example, light hydrocarbon fuels may be employed.

With this construction, inexpensive standard fabrication methods may be employed since the coolant tubes are of constant cross-section. Thus, the invention provides regenerative cooling at substantially reduced cost and fabrication time.

Other objects and advantages of the invention will be apparent from the following description taken in conjunction with the drawings wherein:

FIGURE 1 is a broken front elevational view of a rocket combustion chamber constructed in accordance with the invention;

FIGURE 2 is a sectional view taken along the line 2—2 of FIGURE 1;

FIGURE 3 is a sectional view taken along the line 3—3 of FIGURE 2; and

FIGURE 4 is a sectional view taken along the line 4—4 of FIGURE 2.

Although the invention is shown and described herein with respect to its application to rocket combustion chambers, it may be employed on any type of combustion chamber using regenerative cooling.

Referring to the drawings, there is shown a rocket thrust chamber, in the form of an annular hollow elongated enclosure, generally designated as E, and including an upstream cylindrical combustion chamber or section 10, a contiguous downstream convergent-divergent throat section 12, and an exhaust nozzle section 14 diverging from and contiguous with the throat section 12. The throat section 12 has a cross-sectional area smaller than that of the combustion chamber 10.

The wall of the enclosure E comprises an annular refractory inner wall 16 of high temperature material, an annular outer structural wall 18 spaced from the inner wall to form a space therebetween, a plurality of longitudinally disposed regenerative nontapered coolant tubes 20 positioned in such space between the inner and outer walls in side-by-side relation and having circulating fluid coolant therein, and a coacting variable thickness heat barrier 22 also disposed in said space between the inner and outer walls and enclosing said coolant tubes. The outer wall 18 may be formed of stainless steel. Suitable associated coolant manifolds (not shown) may be affixed at the inlet and the outlet ends of the tubes 20 to direct coolant flow therethrough in a conventional manner.

The coolant tubes 20 are circumferentially spaced apart at the combustion chamber section 10 (FIGURE 3) and at the exhaust nozzle section 14. At the throat section 12, the circumferential spacing of such tubes is contiguous, as shown in FIGURE 4. Thus, circumferential spacing between the tubes varies with the contour of the engine. This structure permits the use of coolant tubes 20 of constant cross-sectional area throughout the entire length of the thrust chamber, thereby permitting simple and inexpensive fabrication techniques. The tubes 20 may be formed of any suitable material such as, for example, stainless steel.

At the combustion chamber section 10 and the exhaust nozzle section 14 wherein the tubes 20 are spaced apart, such tubes may be circumferentially connected together by heat-dispensing fins 24 disposed between and secured to the tubes as shown in FIGURE 3. Such fins 24 function to absorb heat from the heat barrier 22 and transfer it to the coolant in the coolant tubes 20.

The heat barrier 22 may be formed of any suitable heat shielding materials such as foamed or powdered ceramics or certain foamed metals. Aluminum oxide and magnesium oxide may be effective in this application. In the preferred form, the heat barrier 22 is of increased thickness in the throat area section 12 where higher operational temperatures are encountered.

With the above structure, fluid (rocket fuel) coolants having relatively low coolant capacities may be employed. For example, light hydrocarbon fuels may be used.

The inner surface of the inner wall 16 may be covered with a suitable oxidation resistant coating 26.

With the above structure, wherein a heat barrier 22 plus coolant tubes 20 with constant cross-sectional area are employed, a simple and highly inexpensive system of regenerative cooling is provided. The invention effects a simple lower cost fabrication method for regeneratively cooled rocket thrust chambers and provides effective cooling with coolants having low cooling capability. With the present construction, the heat flux through the thrust chamber wall is a function of a total thermal resistance of the wall consisting of the gas side film resistance, the refractory metal wall resistance, the thermal barrier material resistance, the tube wall resistance, and the coolant side film resistance. Since the tube cross-sectional area is held constant, the coolant side film resistance will be nearly constant, except for changes in fluid transport properties with temperature. The design variable used to control inner wall temperature and heat flux is thermal barrier thickness. In one form of the invention, the tube diameter and thermal barrier thickness is such that the inner wall temperature will be the maximum allowable for the oxidation resistant coating 26. Such condition will occur at or near the throat 12. At other points of the chamber the heat barrier thickness may be adjusted to maintain a somewhat lower wall temperature.

The invention has many advantages over previous regenerative cooling structures such as:

(a) The pressure seal needed to maintain the hot combustion gases is provided by a solid, contoured, refractory metal inner wall 16 rather than by a brazed assembly of tapered tubes or channels. The simplicity, reliability, and ease of manufacture of this design are manifest.

(b) The regenerative cooling tubes 20 have constant cross-sectional area and are simply shaped to conform to the desired thrust chamber contour. This eliminates the costly and intricate procedures of tapering the tubes to provide a precise flow area at each axial station.

(c) Control of wall temperature and heat flux is accomplished by initial sizing of coolant tubes 20 and by varying the heat barrier (22) thickness. Additional control is provided by the use of fins (24) between the tubes at the injector (10) and nozzle (14) ends where they are spread apart.

(d) The use of a heat barrier material 22 and high temperature inner wall material 16 makes possible a large reduction in wall heat flux. This facilitates the use of marginal coolants, such as the light hydrocarbon fuels and also extends the range of application of other coolants, such as RP-1. The invention may also have application for throttling engines in which the coolant jacket discharge temperature tends to rise as the chamber pressure decreases.

Thus, the invention features the use of a regenerative thrust chamber structure, wherein the wall temperature is controlled by varying the thickness of the heat barrier material 22 rather than by coolant passage area change (as in prior structures), in conjunction with a refractory metal inner wall 16 which allows the use of higher wall temperatures than are allowable with more common materials of construction. The heat barrier material 22 is confined within the annular space between the inner wall 16 and outer wall 18 structures.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. In a rocket thrust chamber including an annular elongated hollow enclosure with an upstream cylindrical combustion chamber section, a contiguous downstream convergent-divergent throat section having a cross-sectional area smaller that that of the combustion chamber section, and an exhaust nozzle section diverging from and contiguous with the throat section, said enclosure comprising:
   (a) an annular refractory inner wall of high temperature material,
   (b) an annular outer structural wall spaced from the inner wall to form a space therebetween,
   (c) a plurality of longitudinally disposed regenerative coolant tubes of constant cross-section positioned in said space between said inner and outer walls in side-by-side relation and having circulating fluid coolant therein, said coolant tubes being contiguous at the throat section of the thrust chamber and circumferentially spaced apart at the combustion chamber section and at the exhaust nozzle section,
   (d) heat-dispensing fins disposed between and secured to said circumferentially spaced tubes at said combustion chamber section and said exhaust nozzle section for circumferentially connecting the same,
   (e) and a coacting variable-thickness heat barrier also disposed in said space between said walls and encasing said coolant tubes.

2. The structure of claim 1 wherein said coolant tubes are formed of stainless steel.

3. The structure of claim 1 wherein said outer structural wall is formed of stainless steel.

4. The structure of claim 1 wherein said heat barrier is of increased thickness in the throat section area of the chamber.

5. The structure of claim 1 wherein said heat barrier is formed of powdered ceramic.

6. The structure of claim 1 wherein said heat barrier is formed of foamed ceramic.

7. The structure of claim 1 wherein said heat barrier is formed of foamed metal.

8. The structure of claim 1 wherein said heat barrier is formed of aluminum oxide.

9. The structure of claim 1 wherein said heat barrier is formed of magnesium oxide.

10. The structure of claim 1 wherein said coolant has a relatively low cooling capacity.

11. The structure of claim 1 wherein said coolant is a light hydrocarbon fuel.

12. The structure of claim 1 wherein the inner surface of said inner wall is coated with an oxidation-resistant coating.

13. The structure of claim 1 wherein said inner wall is formed of a refractory metal.

14. In a rocket thrust chamber including an annular elongated hollow enclosure with an upstream cylindrical combustion chamber section, a contiguous downstream convergent-divergent throat section having a cross-sectional area smaller that that of the combustion chamber section, and an exhaust nozzle section diverging from and contiguous with the throat section, said enclosure comprising:
   (a) an annular refractory inner wall of high temperature material,
   (b) an annular outer structural wall spaced from the inner wall to form a space therebetween,
   (c) a plurality of longitudinally disposed regenerative coolant tubes of constant cross-section positioned in said space between said inner and outer walls in side-by-side relation and having circulating fluid coolant therein,
   (d) and a coacting variable-thickness heat barrier formed of foamed metal also disposed in said space between said walls and encasing said coolant tubes.

References Cited

UNITED STATES PATENTS

| | | | |
|---|---|---|---|
| 2,268,279 | 12/1941 | Debanham et al. | |
| 2,956,399 | 10/1960 | Beighley | 239—127.1 |
| 3,099,909 | 8/1963 | Newcomb | 239—127.1 |
| 3,289,943 | 12/1966 | Thomas et al. | 239—127.1 |

ALLEN N. KNOWLES, Primary Examiner

U.S. Cl. X.R.

239—453, 533, 584